US011307986B1

(12) United States Patent
Maruf et al.

(10) Patent No.: US 11,307,986 B1
(45) Date of Patent: Apr. 19, 2022

(54) MACHINE LEARNING BASED TIERED MEMORY SYSTEMS AND METHODS

(71) Applicants: Adnan Maruf, Miami, FL (US); Janki Bhimani, Miami, FL (US); Ashikee Ghosh, Miami, FL (US); Raju Rangaswami, Miami, FL (US)

(72) Inventors: Adnan Maruf, Miami, FL (US); Janki Bhimani, Miami, FL (US); Ashikee Ghosh, Miami, FL (US); Raju Rangaswami, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 17/344,449

(22) Filed: Jun. 10, 2021

(51) Int. Cl.
G06F 12/0804 (2016.01)
G06N 20/00 (2019.01)

(52) U.S. Cl.
CPC ......... *G06F 12/0804* (2013.01); *G06N 20/00* (2019.01); *G06F 2212/1021* (2013.01)

(58) Field of Classification Search
CPC ........ G06F 12/0804; G06F 2212/1021; G06N 20/00
See application file for complete search history.

(56) References Cited

U.S. PATENT DOCUMENTS

| 8,656,397 B2* | 2/2014 | Eidus | G06F 9/5088 718/102 |
|---|---|---|---|
| 9,946,657 B1* | 4/2018 | Muthukkaruppan | G06F 12/0868 |
| 2011/0161555 A1* | 6/2011 | Olds | G06F 12/0866 711/103 |
| 2011/0246745 A1* | 10/2011 | Fukui | G06F 12/02 711/209 |
| 2011/0320690 A1* | 12/2011 | Petersen | G06F 3/0685 711/103 |
| 2013/0132641 A1* | 5/2013 | Suzuki | G06F 12/0246 711/103 |
| 2013/0332661 A1* | 12/2013 | Kaneko | G06F 12/0246 711/103 |
| 2014/0129779 A1* | 5/2014 | Frachtenberg | G06F 12/122 711/136 |
| 2017/0024326 A1* | 1/2017 | Luo | G06F 12/123 |
| 2017/0257513 A1* | 9/2017 | Matsumoto | G06K 15/1817 |
| 2017/0371559 A1* | 12/2017 | Higgins | G06F 3/0673 |
| 2018/0349225 A1* | 12/2018 | Bishnoi | G06F 1/30 |
| 2019/0354813 A1* | 11/2019 | Riedmiller | G06K 9/6257 |
| 2020/0118544 A1* | 4/2020 | Lee | G10L 15/005 |

* cited by examiner

Primary Examiner — Prasith Thammavong
(74) Attorney, Agent, or Firm — Saliwanchik, Lloyd & Eisenschenk

(57) ABSTRACT

Systems and methods for dynamically placing data in a hybrid memory structure are provided. A machine learning (ML)-based, adaptive tiered memory system can actively monitor application memory to dynamically place the right data in the right memory tier at the right time. The memory system can use reinforcement learning to perform dynamic tier placement of memory pages.

16 Claims, 6 Drawing Sheets

| Environmental Dynamics | | Observation | Action |
|---|---|---|---|
| 1. $T_{DRAM} \geq T_{PM}$ | (a) $LW_{oc} \geq LW_{pm}$ | • DRAM has hotter pages than PM<br>• 1(a) Pages stayed longer in DRAM | 1(a) Threshold unchanged<br>Hot pages are in DRAM and lifetime increased |
| | (b) $LW_{oc} < LW_{pm}$ | • 1(b) Average lifetime decreased | 1(b) Increase Threshold<br>Hot pages are in DRAM but lifetime decreased |
| 2. $T_{DRAM} < T_{PM}$ | (a) $LW_{oc} \geq LW_{pm}$ | • PM has hotter pages than DRAM<br>• 2(a) Pages stayed longer in DRAM | 2(a) Decrease Threshold<br>lifetime increased, but PM has hotter pages, allow more promotions |
| | (b) $LW_{oc} < LW_{pm}$ | • 2(b) Average lifetime decreased | 2(b) Further observation required |

| Environmental Dynamics | Observation | Action |
|---|---|---|
| $(LW_{pre} / LW_{oc})$ $\leq (T_{PM} / T_{DRAM})$ | • Average lifetime decreased more than average temperature increment | Increase Threshold<br>Try to increase lifetime |
| $(LW_{pre} / LW_{oc})$ $> (T_{PM} / T_{DRAM})$ | • Temperature increment is less than the lifetime decrement | Decrease Threshold<br>Try increasing DRAM temperature, allow more promotions |

FIG. 6

MACHINE LEARNING BASED TIERED MEMORY SYSTEMS AND METHODS

BACKGROUND

For over half a century, dynamic random access memory (DRAM) has been used as the main working memory in computing systems. Keeping pace with the advancement in central processing unit (CPU) technology, DRAM has continued improving its performance and capacity. However, DRAM is expensive and consumes a large amount of power. Persistent memory (PM) technologies alleviate both these shortcomings of DRAM, with a performance that is closely comparable to that of DRAM. Most fundamentally, unlike previous persistent devices, PM devices are directly addressable by the CPU. Thus, they have the potential to replace, or significantly supplement, DRAM devices in providing working volatile memory to computing systems. Also, using PM as an extension to the main memory does not engage the persistent capabilities of a PM device and thereby sidesteps the biggest performance overhead of using PM.

BRIEF SUMMARY

Embodiments of the subject invention provide novel and advantageous systems and methods for dynamically placing data in a hybrid memory structure (that can comprise dynamic random access memory (DRAM) and persistent memory (PM)). A novel infrastructure (which can be referred to herein as "Ruminant") that is a machine learning (ML)-based, adaptive tiered memory system that can actively monitor application memory to dynamically place the data (i.e., to place the right data in the right memory tier at the right time). The memory system can use reinforcement learning to perform dynamic tier placement of memory pages, and this can significantly improve system performance (e.g., the computer system on which the memory system is running) with lower cost and power consumption.

In an embodiment, a system for dynamically placing data in a hybrid memory structure (that can comprise DRAM and a PM tier) can comprise a processor and a (non-transitory) machine-readable medium in operable communication with the processor and having instructions stored thereon that, when executed by the processor, perform the following steps: i) monitoring a memory footprint of the DRAM; ii) monitoring a first plurality of data pages in the DRAM and periodically checking a respective data temperature of each data page of the first plurality of data pages, the respective data temperature of each data page being a measure of how often said data page is accessed; iii) categorizing each data page of the first plurality of data pages based on its respective data temperature, where a data page is categorized as hot if its data temperature is above a threshold data temperature and categorized as cold if its data temperature is at or below the threshold data temperature; iv) if the memory footprint of the DRAM exceeds a predetermined threshold memory footprint, moving any data pages of the first plurality of data pages categorized as cold into the PM tier to become part of a second plurality of data pages; v) monitoring the second plurality of data pages in the PM tier and periodically checking a respective data temperature of each data page of the second plurality of data pages, the respective data temperature of each data page being a measure of how often said data page is accessed; vi) categorizing each data page of the second plurality of data pages based on its respective data temperature, where a data page is categorized as hot if its data temperature is above the threshold data temperature and categorized as cold if its data temperature is at or below the threshold data temperature; vii) moving any data pages of the second plurality of data pages categorized as hot into the DRAM to become part of the first plurality of data pages; viii) utilizing a reinforcement learning (RL) model to update the threshold data temperature; and ix) repeating steps i)-viii) while the system is operating. The moving of any data pages of the first plurality of data pages categorized as cold into the PM tier to become part of the second plurality of data pages can comprise calculating a respective lifetime of each data page moved into the PM tier, the respective lifetime being equal to a current time minus a time said data page was created. The RL model can use, e.g., the following to update the threshold data temperature: an average data temperature of p coldest pages in the DRAM; an average data temperature of p hottest pages in the PM tier; an average lifetime of pages moved from DRAM to the PM tier in a previous window; and an average lifetime of pages moved from DRAM to the PM tier in a current window, where p is an integer, the previous window is the previous time steps i)-viii) were performed, and the current window is the current time steps i)-viii) are being performed. The instructions when executed can further comprise performing the step of moving any newly-created data pages to the DRAM to be part of the first plurality of data pages. The instructions when executed can further comprise performing the steps of: monitoring a utilization of the PM tier; and if the utilization of the PM tier exceeds a predetermined PM tier capacity, either moving any data pages of the second plurality of data pages categorized as cold into a swap space of the hybrid memory structure or engaging an out-of-memory killer of the system to delete any data pages of the second plurality of data pages categorized as cold. The RL model can use just an average data temperature of p coldest pages in the DRAM and an average data temperature of p hottest pages in the PM tier to update the threshold data temperature.

In another embodiment, a method for dynamically placing data in a hybrid memory structure comprising DRAM and a PM tier can comprise: i) monitoring (e.g., by a processor) a memory footprint of the DRAM; ii) monitoring (e.g., by the processor) a first plurality of data pages in the DRAM and periodically checking a respective data temperature of each data page of the first plurality of data pages, the respective data temperature of each data page being a measure of how often said data page is accessed; iii) categorizing (e.g., by the processor) each data page of the first plurality of data pages based on its respective data temperature, where a data page is categorized as hot if its data temperature is above a threshold data temperature and categorized as cold if its data temperature is at or below the threshold data temperature; iv) if the memory footprint of the DRAM exceeds a predetermined threshold memory footprint, moving (e.g., by the processor) any data pages of the first plurality of data pages categorized as cold into the PM tier to become part of a second plurality of data pages; v) monitoring (e.g., by the processor) the second plurality of data pages in the PM tier and periodically checking a respective data temperature of each data page of the second plurality of data pages, the respective data temperature of each data page being a measure of how often said data page is accessed; vi) categorizing (e.g., by the processor) each data page of the second plurality of data pages based on its respective data temperature, where a data page is categorized as hot if its data temperature is above the threshold data temperature and categorized as cold if its data temperature is at or below the threshold data temperature; vii) moving (e.g., by the processor) any data pages of the second plurality of data pages categorized as hot into the DRAM to become part of the first plurality of data pages; viii) utilizing (e.g., by the processor) a reinforcement learning (RL) model to update the threshold data temperature; and ix) repeating steps i)-viii) while the method is being performed on the hybrid memory structure. The moving of any data pages of the first plurality of data pages categorized as cold into the PM tier to become part of the second plurality of data pages can comprise calculating a respective lifetime of each data page moved into the PM tier, the respective lifetime being equal to a current time minus a time said data page was created. The RL model can use the following to update the threshold data temperature: an average data temperature of p coldest pages in the DRAM; an average data temperature of p hottest pages in the PM tier; an average lifetime of pages moved from DRAM to the PM tier in a previous window; and an average lifetime of pages moved from DRAM to the PM tier in a current window, where p is an integer, the previous window is the previous time steps i)-viii) were performed, and the current window is the current time steps i)-viii) are being performed. The method can further comprise moving (e.g., by the processor) any newly-created data pages to the DRAM to be part of the first plurality of data pages. The method can further comprise: monitoring (e.g., by the processor) a utilization of the PM tier; and if the utilization of the PM tier exceeds a predetermined PM tier capacity, either moving (e.g., by the processor) any data pages of the second plurality of data pages categorized as cold into a swap space of the hybrid memory structure or engaging (e.g., by the processor) an out-of-memory killer of the system to delete any data pages of the second plurality of data pages categorized as cold.

BRIEF DESCRIPTION OF DRAWINGS

FIG. 6 shows a decision table for updating a threshold in a memory system according to an embodiment of the subject invention. The left table shows major environmental indicators, observations, and actions taken. The right sub-table has additional environmental indicators for action 2(b) from the left table, along with observations and actions.

DETAILED DESCRIPTION

Figure 1:
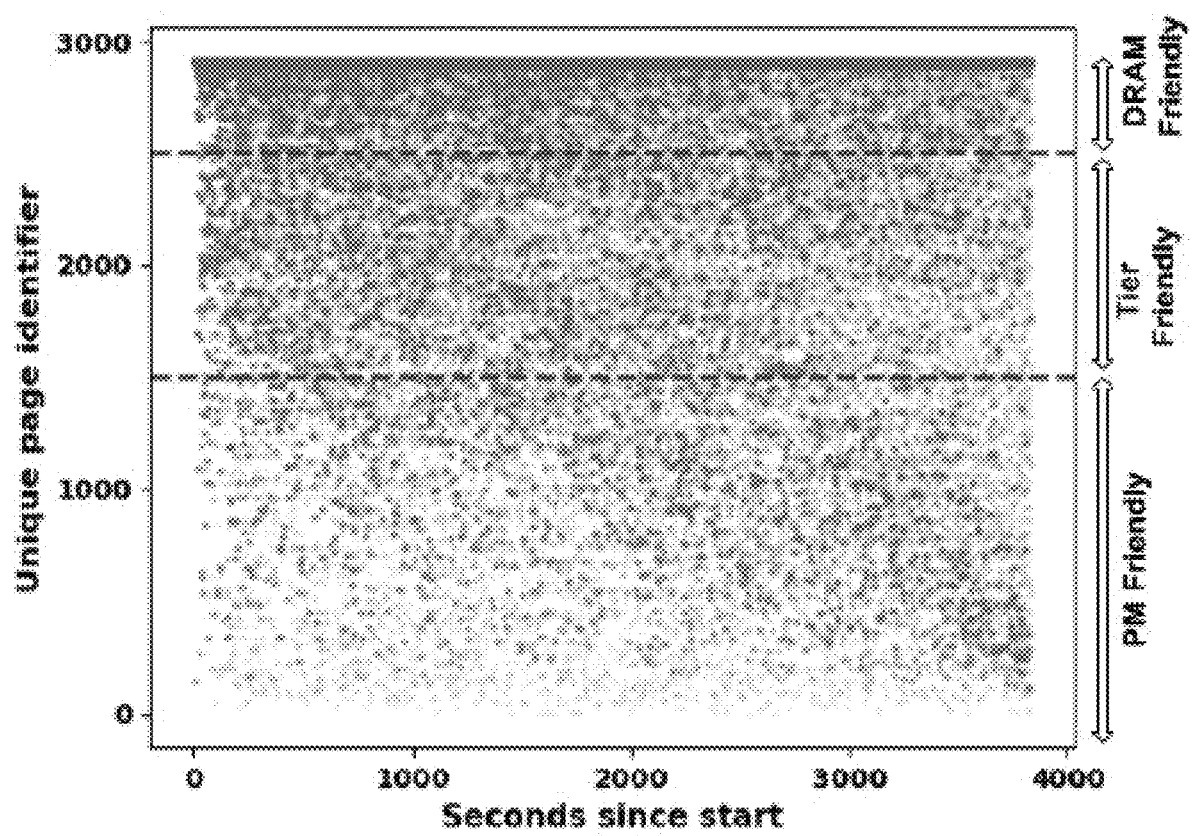
FIG. 1 shows accesses of sampled pages throughout the execution period of a Yahoo Cloud Serving Benchmark (YCSB) MemCached predefined workload D (see Cooper et al., Benchmarking cloud serving systems with YCSB, In Proceedings of the ACM symposium on Cloud computing, SoCC '10, June 2010; and Fitzpatrick, Distributed caching with memcached, In Linux Journal, 2004; both of which are hereby incorporated by reference herein in their entireties). Though only accesses of sample pages for workload D are shown in FIG. 1, experiments were also carried on workloads A, B, C, and F, and the results were similar to that of workload D.

The rapid growth of in-memory computing by data-intensive applications today has increased the demand for memory, such as dynamic access memory (DRAM). However, a DRAM-based system is limited in terms of capacity, cost, and power consumption. Hybrid memory systems, which include different types of memory (e.g., DRAM and persistent memory (PM)), can be used. PM devices are byte-addressable, large in capacity, and consume less power than DRAM systems. One approach is to introduce these PM devices as a second memory tier that is directly exposed to the central processing unit (CPU). This tiered design presents the key challenge of placing the right data in the right memory tier at the right time. Embodiments of the subject invention provide novel and advantageous systems and methods for dynamically placing data in a hybrid memory structure. A novel infrastructure (which can be referred to herein as "Ruminant") that is a machine learning (ML)-based, adaptive tiered memory system that can actively monitor application memory to dynamically place the data (i.e., to place the right data in the right memory tier at the right time). The memory system can use reinforcement learning to perform dynamic tier placement of memory pages, and this can significantly improve system performance (e.g., the computer system on which the memory system is running) with lower cost and power consumption.

Embodiments of the subject invention can provide a tiered memory system where both DRAM and PM work as the system's main memory. In some related art systems (e.g., Memory Mode) DRAM is used as a cache of PM, where DRAM is not accessible by the applications. Embodiments provide dynamic migration of pages between higher tier and lower tier. Candidate pages for migration can be selected using a reinforcement learning technique. The page selection process in the related art (e.g., static tiering) can be very straightforward.

Computing systems manage application data at page level granularity. Embodiments of the subject invention can place the most frequently accessed pages in the DRAM tier and the least frequently accessed pages in the PM tier by periodically scanning pages in both of the tiers. A set of scans form a time window. In each scan, ML-based, adaptive tiered memory system can calculates temperatures of pages (note that temperature in this context does not refer to the physical temperature (e.g., in ° C., ° F., or K) but rather a metric for how often a page is accessed in a set period of time (can also be referred to as its "hotness")), and pages with a temperature higher than a threshold value can get selected for promotion (see also FIG. 4). The threshold can be updated at the end of each time window using a reinforcement learning algorithm, which can be based on the average temperature of the pages in the DRAM and PM tier and the average lifetime of the pages demoted from the DRAM to the PM tier in the previous and current time window (see also FIG. 6). In addition to dynamic page migrations, embodiments of the subject invention can also provide (or even guarantee) all new allocations of pages from the DRAM tier to boost the performance.

Embodiments of the subject invention: provide a new pathway of using PM more efficiently for existing systems; improve system performance (e.g., the computer system on which the memory system is running) by lowering the cost and power consumption; and are applicable to (and advantageous for) all high memory demanding applications running on large scale systems.

As PM devices become available in dual in-line memory module (DIMM) form factor, how they get used by applications alongside or as a replacement for DRAM becomes relevant. A hybrid memory system including DRAM and PM can function better than DRAM-only or PM-only systems. Many ways to combine these devices lead to suboptimal performance outcomes, but the adaptive tiered memory systems of embodiments of the subject invention actively monitor application memory to dynamically place the right data in the right memory tier at the right time, with good performance outcomes. Reinforcement learning can be used to perform dynamic tier placement of memory pages. The memory system can observe changes in the temperature and lifetime of DRAM tier resident memory pages as a result of pages getting promoted from PM to DRAM, thereby modifying the DRAM promotion temperature threshold (reward).

PM has been investigated to supplement DRAM and scale up volatile main memory. Hybrid memory systems with DRAM and PCM (phase change memory) that use modified memory controller to determine where pages should reside between PCM and DRAM have been proposed (Dhiman et al., A hybrid pram and dram main memory system, In Proceedings of the Annual Design Automation Conference, 2009; Ramos et al., Page placement in hybrid memory systems, In Proceedings of the 25th International Conference on Supercomputing, ICS '11, 2011). DRAM and PCM have also been used side by side in a hybrid system where DRAM acts as a buffer cache for PCM (Qureshi et al., Scalable high-performance main memory system using phasechange memory technology, In Proceedings of the International Symposium on Computer Architecture, ISCA '09, 2009). Yang et al. proposed an empirical guideline of using PM as persistent storage and recommended several best practices such as avoiding random accesses smaller than 256 bytes (B) and using nontemporal stores for large file transfers (Yang et al., An empirical guide to the behavior and use of scalable persistent memory, In 18th USENIX Conference on File and Storage Technologies (FAST 20) (Santa Clara, Calif., February 2020), USENIX Association, pp. 169-182). These related art approaches of using PM as the main memory either require hardware modifications or use DRAM as a cache of PM, reducing total usable memory. In contrast, embodiments of the subject invention solve the problem by leveraging the operating system for dynamic page migrations and without compromising the capacity of usable main memory.

A promising usage of PM is in tiered memory systems. One approach to building such a tiered memory system is static tiering, in which once the DRAM tier capacity is used up, subsequent allocations are made from the PM tier. However, this simple approach fails under dynamic memory consumption as typical in a computing system in which pages residing in DRAM get much less frequently accessed than PM-resident pages. Embodiments of the subject invention provide tiered memory systems that actively monitor application memory to dynamically place the right data in the right memory tier at the right time. Reinforcement learning can be used to perform dynamic tier placement of memory pages. The memory system can observe changes in the temperature and lifetime of DRAM tier resident memory pages as a result of pages getting promoted from PM to DRAM, thereby modifying the DRAM promotion temperature threshold (reward).

In a simple tiered system in which pages are first allocated (or get "born in") in the DRAM tier, when the system starts running low on free space in DRAM, the system starts demoting less frequently accessed pages to the PM tier to free up DRAM space for new allocations. Without an available promotion mechanism, a demoted page would reside in the PM tier for the rest of its lifetime. If a significant number of demoted pages get frequently accessed post-demotion, a complementary promotion mechanism that allows demoted pages to move back to the DRAM tier may result in better system performance. However, a tiered system with the facility of promoting pages from PM to DRAM can improve performance only if promoted pages are accessed relatively more frequently for a reasonable amount of time afterward.

In order to evaluate the potential for a promotion mechanism in improving workload performance, the access patterns of pages in memory can be observed over time within applications. Unique pages can be randomly selected from memory and assigned unique identifiers. The reference bits of all the sampled pages can be periodically scanned. During a scan, if the reference bit of a page is found set, the bit can be cleared. If a page's reference bit is found set during a scan, that page must have been accessed at least once since the previous one.

In FIG. 1, accesses of sampled pages throughout the execution period of a Yahoo Cloud Serving Benchmark (YCSB) MemCached predefined workload D are shown (see Cooper et al., supra.; and Fitzpatrick, supra.). On the y-axis, pages are sorted in ascending order of their total number of accesses. Each point (x,y) in the plot represents an access of the $y^{th}$ page at time x. Denser areas represent regions with more frequent page accesses. Based on the density of accesses, the pages can be divided into three classes. The PM friendly pages, contained within the lower range (e.g., 0-1499) are accessed infrequently; promoting these pages from persistent memory tier to DRAM is not likely to be worthwhile considering the cost of moving pages across tiers. Pages in the upper range (e.g., above 2500) are the DRAM friendly pages that were very frequently accessed throughout the execution period; these pages should be DRAM-resident throughout their execution tier for improving application performance. The middle range (e.g., 1500-2500) contains frequent dense areas separated by scattered, less frequent accesses; this range represents Tier friendly pages, which are better served by DRAM and PM at different points in time during their lifetime. A certain percentage (in this case 34%) of all the scanned pages are in the class of Tier friendly pages, motivating a dynamically tiered memory system that is capable of dynamically promoting and demoting pages based on access patterns.

Figure 2:
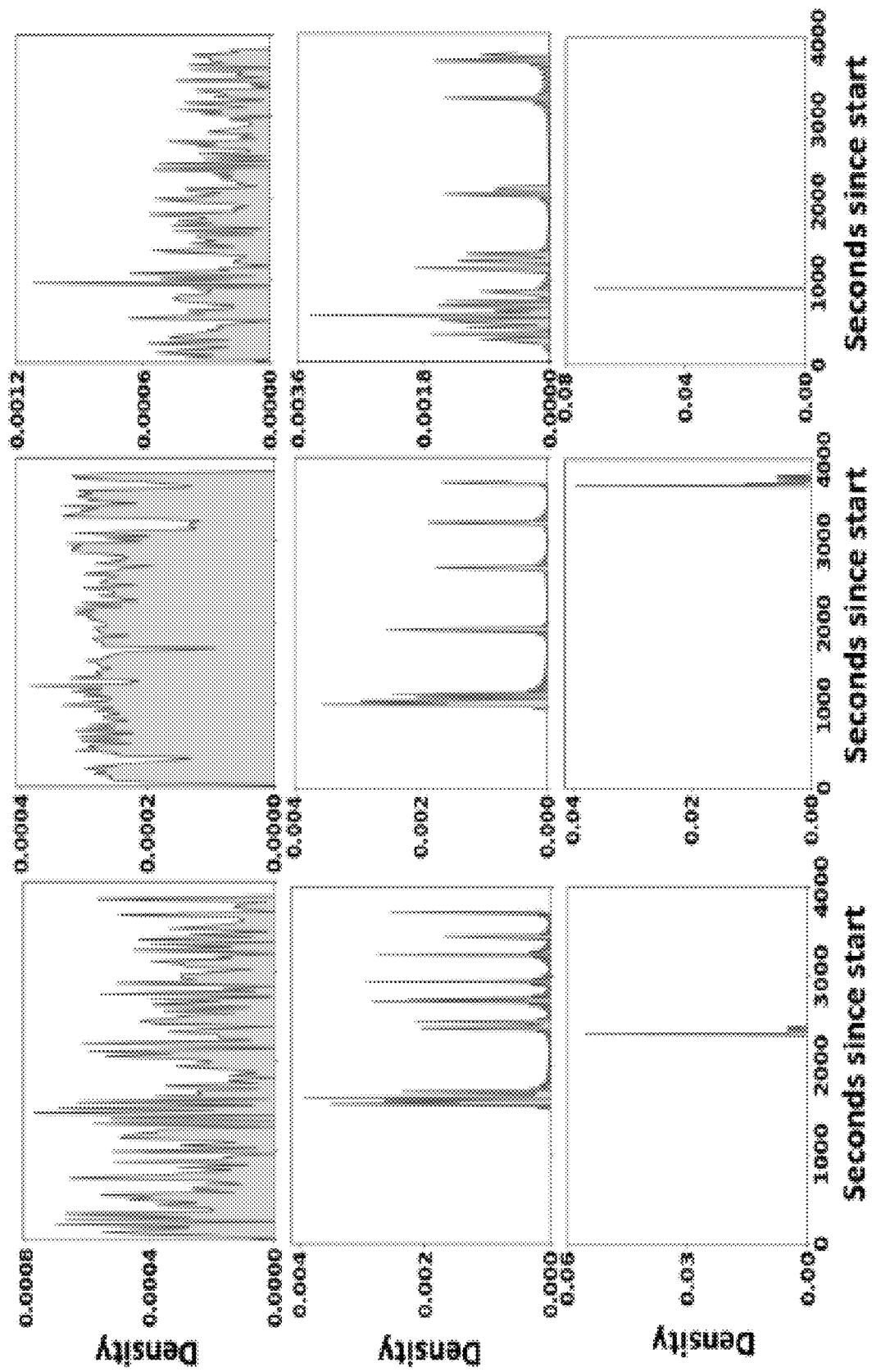
FIG. 2 shows kernel density estimation (KDE) plots for accesses of three randomly selected pages from the three classes (see also Simonoff, Smoothing methods in statistics, Springer, 1998; which is hereby incorporated by reference herein in its entirety). The top row contains dynamic random access memory (DRAM) friendly pages, the middle row represents Tier friendly pages, and the bottom row contains persistent memory (PM) friendly pages. Each plot in FIG. 2 is of density versus seconds since start.

In order to more specifically evaluate how accesses within each tier were clustered and also evaluate if there is adequate reuse within the clusters, three pages can be randomly selected from each of the three classes and the corresponding kernel density estimation (KDE) metric can be calculated for the accesses of each of those pages (see Simonoff, supra.). KDE estimates the probability density function for a single variable, as shown in FIG. 2. For tier friendly pages (the middle row of FIG. 2), clusters of higher probability densities are distinct from other accesses, and these higher probability clusters have reasonable time distances between each other. These pages are favorable for Ruminant because Ruminant can identify these tier friendly pages in PM tier when initial accesses within a cluster are observed, upon which Ruminant can promote these pages to the DRAM tier, in which they experience lower access latencies for the remaining accesses within the cluster.

Figures 3A, 3B:
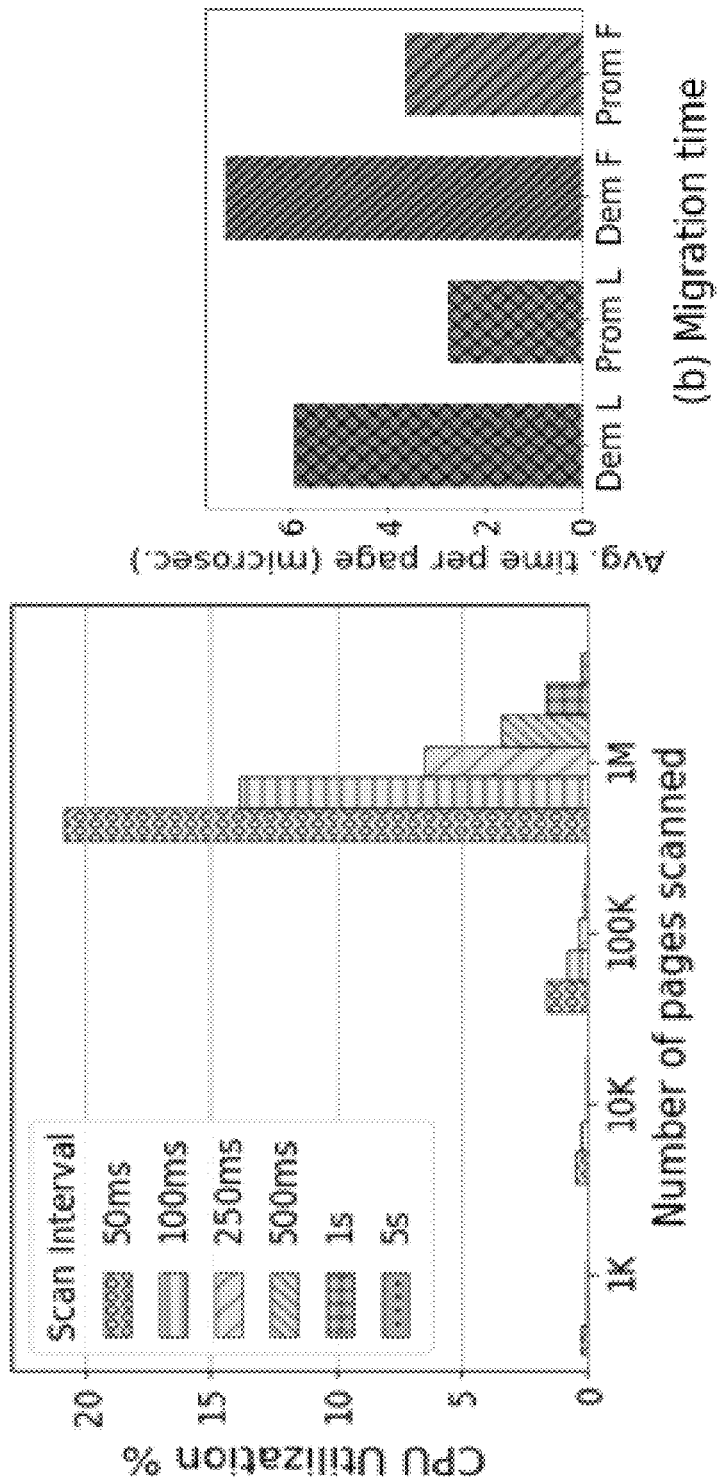
FIG. 3(a) shows a bar chart of CPU utilization percentage (%) versus number of pages scanned. In each grouping, the left-most bar is for a scan interval of 50 milliseconds (ms); the second-to-the-left-most bar is for a scan interval of 100 ms; the third-to-the-left-most bar is for a scan interval of 250 ms; the fourth-to-the-left-most bar is for a scan interval of 500 ms; the fifth-to-the-left-most bar is for a scan interval of 1 second (s); and the right-most bar is for a scan interval of 5 s.
FIG. 3(b) shows a bar chart of average time per page (in ms) for systems where demotions and promotions take place in the same local node (labeled as "Dem L" and "Prom L", respectively) and also for the systems where demotions and promotions occur between a local and far node (labeled as "Dem F" and "Prom F", respectively).

Pages that can benefit from dynamic tiering have been analytically identified. However, the cost of locating promotable pages should be manageable in a production system. Further, the overhead of migrating pages across tiers should be affordable with respect to the accrued performance improvement. For large scale systems, which keep millions of pages in the memory, how frequently and how many pages are needed to check for references will dominate this overhead. The CPU utilization of a system thread that scans for references on a variable number of pages at different scan intervals was measured on a 32 core (dual-socket) Intel Xeon® Gold CPU with 2.30 GHz clock speed. FIG. 3(a) shows that for up to a hundred thousand pages scanned, the CPU utilization is negligible regardless of the scan intervals. Also, even for a million pages scan, the overhead is still below 5% for the 500 ms, 1 second, and 5 second intervals.

Next, the migration latency was measured for individual pages across tiers. FIG. 3(b) depicts the estimated promotion and demotion costs for the systems where demotions and promotions take place in the same local node (labeled "Dem L" and "Prom L", respectively) and also for the systems where migration occurs between a local and far node (labeled "Dem F" and "Prom F" for demotions of this type and promotions of this type, respectively). The viability of the selected interval for scanning must take into account the time a system takes to migrate any selected pages. If a system decides to promote one hundred thousand far pages, which takes around 400 ms, the scan interval needs to be at least 400 ms. Because all migration times are less than 10 ms on average, and an interval needs to be used at least in milliseconds for scanning a good number of pages, it is feasible to migrate pages periodically without incurring much overhead. The diversity in page access pattern and the low overhead of page migration and scanning are some of the advantages of the adaptive dynamic tiered memory systems of embodiments of the subject invention, which migrate pages between tiers for improved system performance.

In many embodiments, a tiered memory system (which can be referred to as "Ruminant") can identify the most frequently accessed pages in the PM tier and move those pages to the DRAM tier. Ruminant focuses its internal mechanisms on promoting pages to DRAM from PM and can rely on an existing process (e.g., Linux's existing kswapd daemon) to demote pages to PM from DRAM. Important aspects of Ruminant include the life cycle of a page in Ruminant, periodic scanning to identify candidate pages to promote, time windows for measuring page temperature, and the dynamic updating of the promotion threshold temperature.

Regarding the life cycle of a page, every page is born in the DRAM tier. Over time, a newly allocated page can become more popular (hot) or can barely be accessed (cold). A page is deemed hot if it is accessed more frequently relative to most other pages; conversely, a page is called cold if it is accessed less frequently than others. Regardless of the temperature of a page, all pages stay in the DRAM tier until the memory footprint of the workload approaches DRAM capacity. Under DRAM pressure, cold pages are demoted to the PM tier.

Pages can be moved to the PM only via demotions. Ruminant can periodically check the temperature of the pages, and can promote only the pages in the PM to the DRAM tier that exceed a promotion temperature threshold. Cold pages of the PM stay in the PM until there is free space in the PM tier. If the PM tier utilization approaches its capacity, cold pages are moved out to the swap space if available, else the system's out-of-memory killer will be engaged (see Goldwyn Rodrigues, Taming the OOM killer, lwn:net/Articles/317814, 2009; which is hereby incorporated by reference herein in its entirety). If a cold page at time $t_i$ stays in PM until time $t_j$, and becomes hot at time $t_j$, where $t_j > t_i$, Ruminant can identify the page and promote the page to the DRAM tier.

Regarding identifying candidate pages for promotion, accurately identifying hot pages in the PM tier is a principal requirement for the success of Ruminant. In order to identify such pages, Ruminant depends on two important properties of the pages: temperature; and lifetime. temperature defines the hotness of a page, and lifetime is the average DRAM lifetime of the pages demoted from the DRAM to PM. Ruminant maintains a temperature threshold denoted by $\not{p}$; pages above $\not{p}$ resident in PM get promoted.

Ruminant can utilize reinforcement learning to dynamically adapt the threshold based on the temperature and lifetime. At a high level, whenever the temperature of a page in the PM tier crosses this temperature $\not{p}$, the page is promoted. Thus, a higher threshold allows fewer promotions. Every page is assigned a birth time when that page is allocated; when a page gets demoted, its lifetime can be calculated at the time of its demotion by subtracting the birth time from the current time.

Regarding updating page temperature, the temperature of the pages can be calculated and updated periodically. In order to do so, Ruminant can run a program (e.g., a kscand daemon) to scan pages periodically. The main objective of the program (e.g., kscand) can be to calculate the temperature of the pages both in DRAM and the PM tier. The program (e.g., kscand) can go through the page list and check the reference bit of each page. If the page's reference bit is found set, the program (e.g., kscand) can simply increment the temperature of the page. The program (e.g., kscand) can also calculate the average temperature of all the pages it scanned. More specifically, the program (e.g., kscand) can compute the average temperature of the N coldest pages from the DRAM tier and the average temperature of the N hottest pages of the PM tier.

Figure 4:
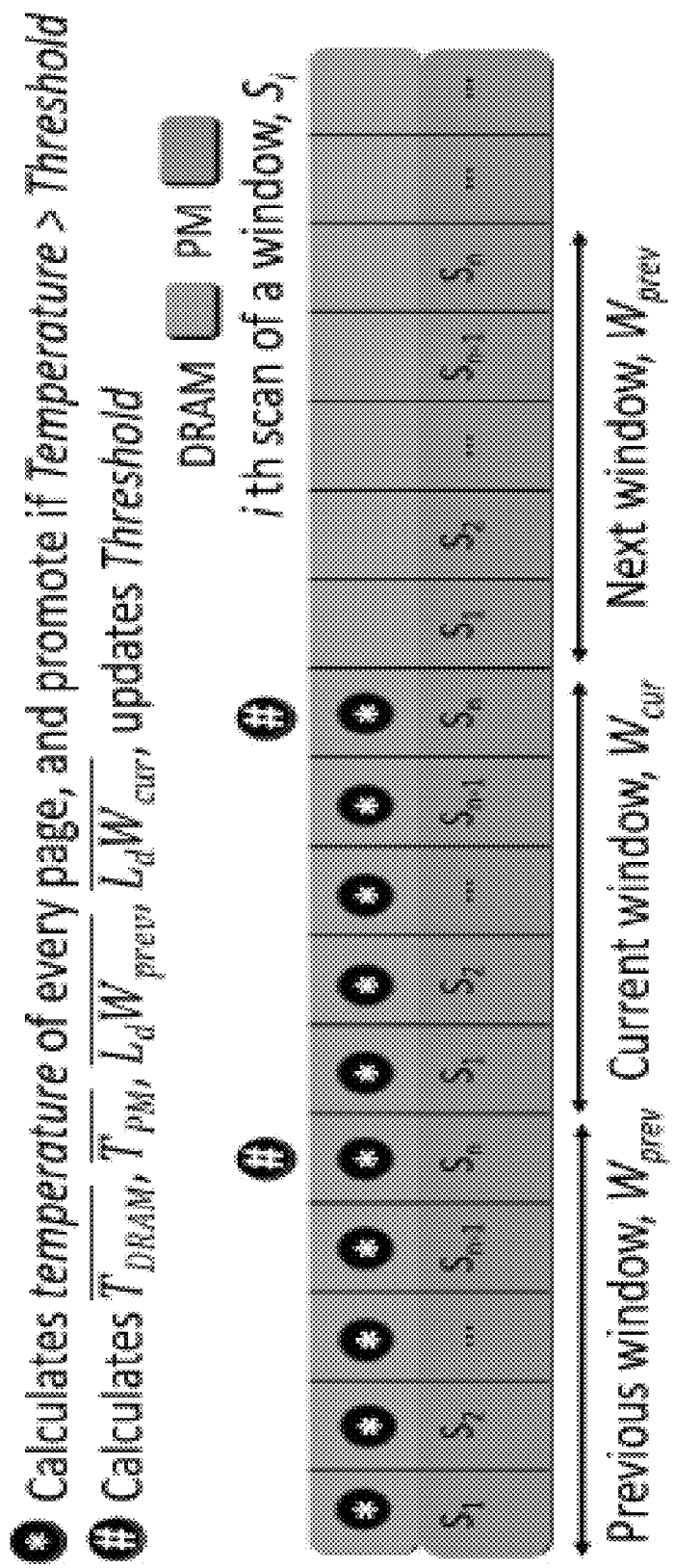
FIG. 4 shows a schematic view of tasks performed by a memory system, according to an embodiment of the subject invention, during every scan and window. A window includes n scans, and $S_i$ represents each scan. Tasks marked with an "*" are performed in every scan, and tasks marked with a "#" are performed only in the last scan of the window.

The temperature of pages and the threshold are window-based and can be updated after each time window, which encompasses multiple scans. FIG. 4 shows the tasks performed in a scan and time window. During every scan, Ruminant can calculate the page temperature by checking the page reference bit. Thus, if there are s scans in a time window, the temperature can be anything from 0 to s (i.e., the number of scans where the page has been accessed out of all s scans). If the temperature of a page exceeds the threshold, the page can be moved to a list called promote list and at the end of a scan, all the pages in the promote list can be promoted. Multiple scans form a window, and at the end of the window, Ruminant can update the threshold based on different calculations discussed below. The number of scans in a window, scanning interval, and the maximum number of pages the program (e.g., kscand) scans can be set empirically.

Regarding updating the promotion temperature threshold, a reinforcement learning (RL) model can be used to update the threshold. The threshold can act as the RL agent, pages in the DRAM and PM tier can constitute the RL environment, and the RL action can be promoting pages. Following are the four environment variables in the RL model that can be used: i) average temperature of the p coldest pages in the DRAM tier, $T_{DRAM}(bar)$; ii) average temperature of the p hottest pages in the PM tier, $T_{PM}(bar)$; iii) average lifetime of demoted pages in previous window, $L_d W_{prev}(bar)$; and iv) average lifetime of demoted pages in current window, $L_a W_{cur}(bar)$.

In order to update the threshold based on the above environmental variables, the environment dynamics can be observed, and actions can be performed following the decision table in FIG. 6. Two main goals can be considered. First, the system can try to keep the average temperature of the PM pages lower than the average temperature of the DRAM pages. A higher temperature of the PM pages means these pages are being accessed more frequently than the DRAM pages. Because both read and write latency to the PM pages are greater than those to DRAM, the system performance will be improved by promoting these pages to DRAM. Second, the system tries to improve the average lifetime of the pages in the DRAM tier. This ensures that the promoted pages are staying longer in the DRAM. The possible conditions potentially requiring an updating of the threshold are summarized in FIG. 6.

Embodiments of the subject invention combine the use of PM as a low performing but large capacity and low power consuming memory tier with a high performing but high power consuming DRAM tier. As the examples illustrate, the approach of the Ruminant memory provides significant performance improvement without sacrificing any usable main memory. In particular, Ruminant outperformed static tiering in all cases and showed better performance than memory mode for most of the YCSB workloads, even when using less memory resources. In order to achieve these performance gains, Ruminant can be configured with a fixed value for the scan interval, the number of scans in a window, and the number of pages it scans. Although Ruminant can adapt the threshold (e.g., increase or decrease by one unit at a time) using its reinforcement learning model, the other parameters can be statically set or chosen.

Embodiments of the subject invention address the technical problem of diminished total usable memory and/or necessary hardware modifications in hybrid DRAM/PM systems by providing ML-based, adaptive tiered memory systems that can actively monitor application memory to dynamically place the right data in the right memory tier at the right time.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., sub-ranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the embodiments of the subject invention and of their many advantages may be had from the following examples, given by way of illustration.

The following examples are illustrative of some of the methods, applications, embodiments, and variants of the present invention. They are, of course, not to be considered as limiting the invention. Numerous changes and modifications can be made with respect to embodiments of the invention.

MATERIALS AND METHODS

An evaluation of a memory system of an embodiment of the subject invention (Ruminant) was conducted with high memory consuming applications. The system's performance was contrasted with all DRAM, static tiering, and memory mode alternative approaches (see also Usharani (Intel), Quick Start Guide: Provision Intel R Optane™ DC Persistent Memory, software:intel:com/en-us/articles/quick-start-guide-configure-intel-optane-dcpersistent-memory-on-linux, September 2019; which is hereby incorporated by reference herein in its entirety). Static tiering allocates pages in DRAM until it gets filled up completely, and then switches to allocating from PM; pages do not migrate across tiers during their lifetime. Intel's memory mode is an out-of-the-box solution for using PM as the main memory of the system. In memory mode, DRAM works as a cache for the PM, reducing the usable main memory capacity from DRAM+PM to only PM. Any access to the data residing in PM requires it to be first loaded into DRAM.

All experiments were conducted on a 48 core (dual-socket) Intel Xeon machine with 376 GB DRAM and 1.5 TB PM. The 376 GB DRAM consists of twelve 32 GB 2666 MT/s DDR4s from Micron, and the 1.5 TB PM consists of twelve 128 GB Intel Optane DC Persistent Memory DIMMs. Ruminant has at least the following three tunable parameters: i) scan interval; ii) window size; and iii) number of pages to scan. Empirically, the following were chosen: 1 second as scan interval; a window of 10 scans; and 1024 page scans in a single scan. The Ruminant prototype was based on Linux kernel 5.3.1 and ran the Fedora distribution.

Yahoo Cloud Serving Benchmark (YCSB) workloads (Cooper et al., supra.) and GAP Benchmark Suite's (GAP) PageRank were used (see Beamer et al., The gap benchmark suite, In arXiv:1508.03619, 2015; which is hereby incorporated by reference herein in its entirety). YCSB is a key-value store benchmark that was run with memcached (Fitzpatrick, supra.), an in-memory cache that stores all the key-value pairs. YCSB first loads the data in memory and then runs six different workloads named as A, B, C, D, E, and F (Bailey et al., Ycsb core workloads, github:com/brianfrankcooper/YCSB/wiki/Core-Workloads, October 2010; which is hereby incorporated by reference herein in its entirety). Workload E was discarded because memcached does not support range queries; an update only workload named W was also added to evaluate the impact of slower writes when using PM. PageRank implements a memory intensive popular web page ranking algorithm used by the search engines.

EXAMPLE 1

Figures 5A, 5B:
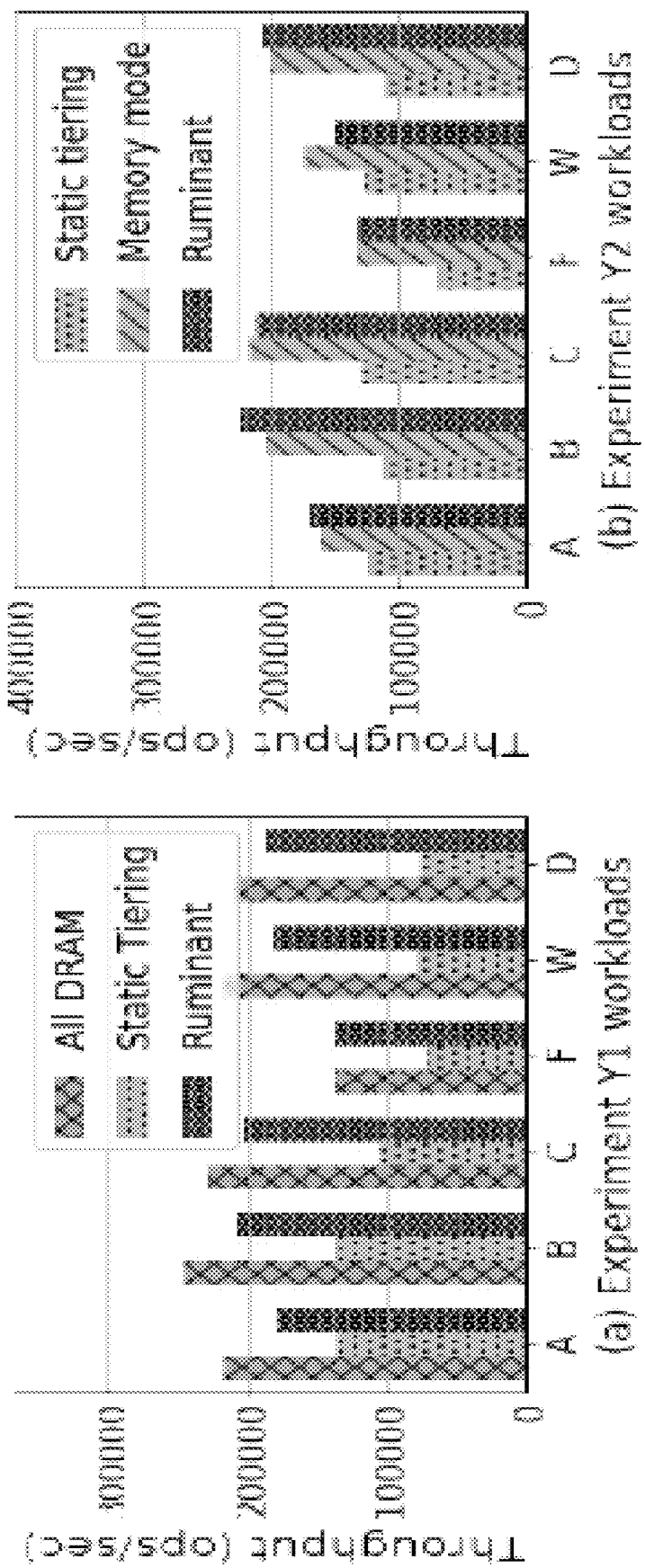
FIG. 5(a) shows a bar chart of throuphput (in operations per second (ops/sec)) at A, B, C, F, W, and D workloads in a first experiment. In each grouping, the left-most bar is for an all DRAM system; the middle bar is for static tiering; and the right-most bar is for a memory system of an embodiment of the subject invention (labeled as "Ruminant").
FIG. 5(b) shows a bar chart of throughput (in operations per second (ops/sec)) at A, B, C, F, W, and D workloads in a second experiment. In each grouping, the left-most bar is for static tiering; the middle bar is for memory mode; and the right-most bar is for a memory system of an embodiment of the subject invention (labeled as "Ruminant").

An experiment (labeled "Y1" in FIG. 5(*a*)) was run based on the YCSB workloads creating/accessing 100 million records using 100 million operations with a memory footprint of 150 GB. For this experiment static tiering and Ruminant were configured with 32 GB DRAM and 344 GB PM totaling 376 GB system memory. Further, the all DRAM configuration had 376 GB DRAM memory. Ruminant was compared with all DRAM and static tiering.

As the performance of DRAM is better than PM, it was expected that the all DRAM configuration would perform the best. As shown in FIG. 5(*a*), when compared with all DRAM, the throughput degradation of Ruminant is from 0% to 17.66%.

Static tiering performed the worst as it fails to recognize the diversity in page access patterns. Ruminant performed significantly better than the static tiering. Ruminant's performance gain varies from 31.17% to 152.57% of static tiering.

EXAMPLE 2

An experiment (labeled "Y2" in FIG. 5(*b*)) was run based on the YCSB workloads with 1 billion records and 667 million operations, resulting in a 1.4 TB memory footprint. Static tiering and Ruminant were configured with 376 GB DRAM and 1128 GB PM totaling 1.5 TB system memory. The 1128 GB PM was equally distributed between the two sockets, i.e., each NUMA node had 564 GB PM. In memory mode, the system had 1.5 TB usable memory of PM with a backend cache of 376 GB DRAM. Thus, technically memory mode was using all of 376 GB DRAM in addition to the 1.5 TB PM (1.8 TB total) where both static tiering and Ruminant used 1.5 TB system memory (376 GB DRAM+ 1.1 TB PM). Ruminant was compared with the memory mode and static tiering. It is noted that all four systems (Ruminant, all DRAM, memory mode, and static tiering) could not be with a single experiment because the memory mode uses all of the DRAM as its last level cache, so any workload with a memory footprint less than the DRAM capacity would be served from the cache and would result in its best performance, similar to the all DRAM configuration. Consequently, a workload with large memory footprint was used, and Ruminant, static tiering, and memory mode were compared in this separate experiment (separate from Example 1).

Referring to FIG. 5(*b*), Ruminant outperformed static tiering in this experiment as well. In comparison with memory mode, Ruminant performed better in workload A (5.49%), B (10.13%), F (0.07%), and D (2.46%) as FIG. 5(*b*) depicts. Ruminant showed degraded performance only for workloads C and W. The YCSB workload C is 100% read, and workload W is a 100% update operation. The degradation was likely due to the variation of PM's read latency for random and sequential reads for workload C, and due to the lower write bandwidth of PM for workload W.

EXAMPLE 3

Examples 1 and 2 were repeated on the GAP PageRank workload. Similar to the experiments with the YCSB workloads, Ruminant performed significantly better than static tiering and memory mode.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for dynamically placing data in a hybrid memory structure comprising dynamic random access memory (DRAM) and a persistent memory (PM) tier, the system comprising:
   a processor; and
   a machine-readable medium in operable communication with the processor and having instructions stored thereon that, when executed by the processor, perform the following steps:
   i) monitoring a memory footprint of the DRAM;
   ii) monitoring a first plurality of data pages in the DRAM and periodically checking a respective data temperature of each data page of the first plurality of data pages, the respective data temperature of each data page being a measure of how often said data page is accessed;
   iii) categorizing each data page of the first plurality of data pages based on its respective data temperature, where a data page is categorized as hot if its data temperature is above a threshold data temperature and categorized as cold if its data temperature is at or below the threshold data temperature;
   iv) if the memory footprint of the DRAM exceeds a predetermined threshold memory footprint, moving any data pages of the first plurality of data pages categorized as cold into the PM tier to become part of a second plurality of data pages;
   v) monitoring the second plurality of data pages in the PM tier and periodically checking a respective data temperature of each data page of the second plurality of data pages, the respective data temperature of each data page being a measure of how often said data page is accessed;
   vi) categorizing each data page of the second plurality of data pages based on its respective data temperature, where a data page is categorized as hot if its data temperature is above the threshold data temperature and categorized as cold if its data temperature is at or below the threshold data temperature;
   vii) moving any data pages of the second plurality of data pages categorized as hot into the DRAM to become part of the first plurality of data pages;
   viii) utilizing a reinforcement learning (RL) model to update the threshold data temperature; and
   ix) repeating steps i)-viii) while the system is operating,
   the moving of any data pages of the first plurality of data pages categorized as cold into the PM tier to become part of the second plurality of data pages comprising calculating a respective lifetime of each data page moved into the PM tier, the respective lifetime being equal to a current time minus a time said data page was created,
   the RL model using the following to update the threshold data temperature: an average data temperature of p coldest pages in the DRAM; an average data temperature of p hottest pages in the PM tier; an average lifetime of pages moved from DRAM to the PM tier in a previous window; and an average lifetime of pages moved from DRAM to the PM tier in a current window, p being an integer,
   the previous window being the previous time steps i)-viii) were performed, and
   the current window being the current time steps i)-viii) are being performed.

2. The system according to claim 1, the instructions when executed further performing the following step:
   moving any newly-created data pages to the DRAM to be part of the first plurality of data pages.

3. The system according to claim 2, the instructions when executed further performing the following steps:
   monitoring a utilization of the PM tier; and
   if the utilization of the PM tier exceeds a predetermined PM tier capacity, moving any data pages of the second plurality of data pages categorized as cold into a swap space of the hybrid memory structure.

4. The system according to claim 2, the instructions when executed further performing the following steps:
   monitoring a utilization of the PM tier; and
   if the utilization of the PM tier exceeds a predetermined PM tier capacity, engaging an out-of-memory killer of the system to delete any data pages of the second plurality of data pages categorized as cold.

5. The system according to claim 1, the instructions when executed further performing the following step:
   moving any newly-created data pages to the DRAM to be part of the first plurality of data pages.

6. The system according to claim 1, the instructions when executed further performing the following steps:
   monitoring a utilization of the PM tier; and
   if the utilization of the PM tier exceeds a predetermined PM tier capacity, moving any data pages of the second plurality of data pages categorized as cold into a swap space of the hybrid memory structure.

7. The system according to claim 1, the instructions when executed further performing the following steps:
   monitoring a utilization of the PM tier; and
   if the utilization of the PM tier exceeds a predetermined PM tier capacity, engaging an out-of-memory killer of the system to delete any data pages of the second plurality of data pages categorized as cold.

8. The system according to claim 1, the RL model using an average data temperature of p coldest pages in the DRAM and an average data temperature of p hottest pages in the PM tier to update the threshold data temperature, p being an integer.

9. A method for dynamically placing data in a hybrid memory structure comprising dynamic random access memory (DRAM) and a persistent memory (PM) tier, the method comprising:
   i) monitoring, by a processor, a memory footprint of the DRAM;
   ii) monitoring, by the processor, a first plurality of data pages in the DRAM and periodically checking a respective data temperature of each data page of the first plurality of data pages, the respective data temperature of each data page being a measure of how often said data page is accessed;
   iii) categorizing, by the processor, each data page of the first plurality of data pages based on its respective data temperature, where a data page is categorized as hot if its data temperature is above a threshold data temperature and categorized as cold if its data temperature is at or below the threshold data temperature;
   iv) if the memory footprint of the DRAM exceeds a predetermined threshold memory footprint, moving, by the processor, any data pages of the first plurality of data pages categorized as cold into the PM tier to become part of a second plurality of data pages;
   v) monitoring, by the processor, the second plurality of data pages in the PM tier and periodically checking a respective data temperature of each data page of the second plurality of data pages, the respective data temperature of each data page being a measure of how often said data page is accessed;

vi) categorizing, by the processor, each data page of the second plurality of data pages based on its respective data temperature, where a data page is categorized as hot if its data temperature is above the threshold data temperature and categorized as cold if its data temperature is at or below the threshold data temperature;

vii) moving, by the processor, any data pages of the second plurality of data pages categorized as hot into the DRAM to become part of the first plurality of data pages;

viii) utilizing, by the processor, a reinforcement learning (RL) model to update the threshold data temperature; and ix) repeating steps i)-viii) while the method is being performed on the hybrid memory structure, the moving of any data pages of the first plurality of data pages categorized as cold into the PM tier to become part of the second plurality of data pages comprising calculating a respective lifetime of each data page moved into the PM tier, the respective lifetime being equal to a current time minus a time said data page was created, the RL model using the following to update the threshold data temperature: an average data temperature of p coldest pages in the DRAM; an average data temperature of p hottest pages in the PM tier; an average lifetime of pages moved from DRAM to the PM tier in a previous window; and an average lifetime of pages moved from DRAM to the PM tier in a current window, p being an integer, the previous window being the previous time steps i)-viii) were performed, and the current window being the current time steps i)-viii) are being performed.

10. The method according to claim 9, further comprising moving, by the processor, any newly-created data pages to the DRAM to be part of the first plurality of data pages.

11. The method according to claim 10, further comprising:
monitoring, by the processor, a utilization of the PM tier; and
if the utilization of the PM tier exceeds a predetermined PM tier capacity, moving, by the processor, any data pages of the second plurality of data pages categorized as cold into a swap space of the hybrid memory structure.

12. The method according to claim 10, the instructions when executed further performing the following steps:
monitoring, by the processor, a utilization of the PM tier; and
if the utilization of the PM tier exceeds a predetermined PM tier capacity, engaging, by the processor, an out-of-memory killer of the system to delete any data pages of the second plurality of data pages categorized as cold.

13. The method according to claim 9, further comprising moving, by the processor, any newly-created data pages to the DRAM to be part of the first plurality of data pages.

14. The method according to claim 9, further comprising:
monitoring, by the processor, a utilization of the PM tier; and
if the utilization of the PM tier exceeds a predetermined PM tier capacity, moving, by the processor, any data pages of the second plurality of data pages categorized as cold into a swap space of the hybrid memory structure.

15. The method according to claim 9, further comprising:
monitoring, by the processor, a utilization of the PM tier; and
if the utilization of the PM tier exceeds a predetermined PM tier capacity, engaging, by the processor, an out-of-memory killer of the system to delete any data pages of the second plurality of data pages categorized as cold.

16. A system for dynamically placing data in a hybrid memory structure comprising dynamic random access memory (DRAM) and a persistent memory (PM) tier, the system comprising:
a processor; and
a machine-readable medium in operable communication with the processor and having instructions stored thereon that, when executed by the processor, perform the following steps:
i) monitoring a memory footprint of the DRAM;
ii) monitoring a first plurality of data pages in the DRAM and periodically checking a respective data temperature of each data page of the first plurality of data pages, the respective data temperature of each data page being a measure of how often said data page is accessed;
iii) categorizing each data page of the first plurality of data pages based on its respective data temperature, where a data page is categorized as hot if its data temperature is above a threshold data temperature and categorized as cold if its data temperature is at or below the threshold data temperature;
iv) if the memory footprint of the DRAM exceeds a predetermined threshold memory footprint, moving any data pages of the first plurality of data pages categorized as cold into the PM tier to become part of a second plurality of data pages;
v) monitoring the second plurality of data pages in the PM tier and periodically checking a respective data temperature of each data page of the second plurality of data pages, the respective data temperature of each data page being a measure of how often said data page is accessed;
vi) categorizing each data page of the second plurality of data pages based on its respective data temperature, where a data page is categorized as hot if its data temperature is above the threshold data temperature and categorized as cold if its data temperature is at or below the threshold data temperature;
vii) moving any data pages of the second plurality of data pages categorized as hot into the DRAM to become part of the first plurality of data pages;
viii) utilizing a reinforcement learning (RL) model to update the threshold data temperature; and
ix) repeating steps i)-viii) while the system is operating,
the moving of any data pages of the first plurality of data pages categorized as cold into the PM tier to become part of the second plurality of data pages comprising calculating a respective lifetime of each data page moved into the PM tier, the respective lifetime being equal to a current time minus a time said data page was created,
the RL model using the following to update the threshold data temperature: an average data temperature of p coldest pages in the DRAM; an average data temperature of p hottest pages in the PM tier; an average lifetime of pages moved from DRAM to the PM tier in a previous window; and an average lifetime of pages moved from DRAM to the PM tier in a current window, p being an integer, the previous window being the previous time steps i)-viii) were performed, the current window being the current time steps i)-viii) are being performed, and the instructions when executed further performing the following steps:

moving any newly-created data pages to the DRAM to be part of the first plurality of data pages;

monitoring a utilization of the PM tier; and if the utilization of the PM tier exceeds a predetermined PM tier capacity, either moving any data pages of the second plurality of data pages categorized as cold into a swap space of the hybrid memory structure or engaging an out-of-memory killer of the system to delete any data pages of the second plurality of data pages categorized as cold.

* * * * *